(12) United States Patent
Clermont et al.

(10) Patent No.: US 10,762,679 B2
(45) Date of Patent: *Sep. 1, 2020

(54) PROCESS FOR GENERATING IMAGES WITH REALISTIC MODIFICATIONS

(71) Applicant: ELECTRONICS FOR IMAGING, INC., Fremont, CA (US)

(72) Inventors: Christoph Clermont, Berlin (DE); Christoph Schacht, Berlin (DE)

(73) Assignee: ELECTRONICS FOR IMAGING, INC., Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/159,510

(22) Filed: Oct. 12, 2018

(65) Prior Publication Data

US 2019/0043237 A1 Feb. 7, 2019

Related U.S. Application Data

(62) Division of application No. 13/339,650, filed on Dec. 29, 2011, now Pat. No. 10,102,655, which is a (Continued)

(51) Int. Cl.
*G06T 11/60* (2006.01)
(52) U.S. Cl.
CPC .................................. *G06T 11/60* (2013.01)
(58) Field of Classification Search
None
See application file for complete search history.

(56) References Cited

U.S. PATENT DOCUMENTS

D246,069 S * 10/1977 Bedel ............................. D18/26
4,167,342 A * 9/1979 Mower ....................... B41J 2/51
101/93.05

(Continued)

FOREIGN PATENT DOCUMENTS

DE 4328908 A1 3/1995
DE 10318090 A1 2/2004

OTHER PUBLICATIONS

"Corel Draw! The Best in 32-Bit Graphics! 6" 1995, Corel Corporation, vol. 1—Version 6.0, pp. C.51-C.55, C.84, D.23, G.27, E.178. (Year: 1995).*

(Continued)

*Primary Examiner* — Gandhi Thirugnanam
(74) *Attorney, Agent, or Firm* — Perkins Coie LLP

(57) ABSTRACT

A method for generating an output image with realistic individual text inserts via software loaded on a computer is provided. The method comprises the steps of providing a base image in a commercial graphical format with at least one position frame defined within the base image; the position frame defines an area within the base image where a text insert is insertable; providing software loaded on the computer which transforms a low resolution image into a high resolution image; defining a vector path within the position frame; arranging the text insert along the vector path; composing the text insert wherein the such step comprises the steps of selecting individual elements, sizing the individual elements as a function of the vector path, assembling the elements into letters, and assembling the letters along the vector path to compose the text insert; and entering text of the text insert via a user interface.

18 Claims, 7 Drawing Sheets

Related U.S. Application Data division of application No. 10/886,775, filed on Jul. 7, 2004, now Pat. No. 8,121,338.

(56) References Cited

U.S. PATENT DOCUMENTS

| | | | |
|---|---|---|---|
| 4,199,815 A | 4/1980 | Craig et al. | |
| 4,286,329 A * | 8/1981 | Goertzel | B41B 19/01 178/30 |
| 4,459,586 A * | 7/1984 | McVey | G09G 5/24 283/115 |
| D281,788 S * | 12/1985 | Albert | D18/26 |
| D281,789 S * | 12/1985 | Albert | D18/26 |
| 4,573,199 A * | 2/1986 | Chen | G09G 5/246 178/30 |
| 4,710,885 A * | 12/1987 | Litteken | G06F 17/211 715/236 |
| 4,748,443 A * | 5/1988 | Uehara | G09G 5/246 345/469 |
| 4,862,386 A | 8/1989 | Axelrod et al. | |
| 4,883,291 A * | 11/1989 | Robertson | B41J 2/505 283/117 |
| 4,907,282 A * | 3/1990 | Daly | G09G 5/24 345/471 |
| 4,939,674 A | 7/1990 | Accumanno et al. | |
| 5,073,957 A | 12/1991 | Seto et al. | |
| 5,073,960 A | 12/1991 | Nakai et al. | |
| 5,108,206 A | 4/1992 | Yoshida | |
| 5,214,755 A * | 5/1993 | Mason | G06T 11/60 715/209 |
| 5,280,577 A * | 1/1994 | Trevett | G09G 5/393 345/170 |
| 5,506,942 A * | 4/1996 | Mikuni | G06F 17/214 358/1.11 |
| D374,684 S * | 10/1996 | Buchanan, Jr. | D18/27 |
| 5,590,247 A * | 12/1996 | Mikuni | G06F 17/214 345/467 |
| 5,600,772 A | 2/1997 | Zhou et al. | |
| 5,610,996 A * | 3/1997 | Eller | G06K 9/00416 382/187 |
| 5,621,864 A | 4/1997 | Benade et al. | |
| 5,659,603 A | 8/1997 | Orlofsky | |
| 5,692,117 A * | 11/1997 | Berend | G06T 11/001 345/475 |
| 5,729,704 A | 3/1998 | Stone et al. | |
| 5,761,238 A | 6/1998 | Ross et al. | |
| 5,761,328 A * | 6/1998 | Solberg | G06K 9/00476 382/113 |
| 5,799,219 A | 8/1998 | Moghadam et al. | |
| 5,805,783 A * | 9/1998 | Ellson | G06T 15/20 345/419 |
| 5,870,107 A * | 2/1999 | Fujisawa | G06T 11/203 345/467 |
| 5,940,084 A * | 8/1999 | Motokado | G06T 11/203 345/441 |
| 5,995,724 A | 11/1999 | Mikkelsen et al. | |
| 6,049,390 A | 4/2000 | Notredame et al. | |
| 6,057,845 A * | 5/2000 | Dupouy | G06F 3/0481 382/186 |
| 6,064,397 A | 5/2000 | Herregods et al. | |
| 6,081,816 A * | 6/2000 | Agrawal | G06F 17/211 715/210 |
| 6,130,667 A * | 10/2000 | Hasegawa | G06K 15/02 345/467 |
| 6,134,018 A | 10/2000 | Dziesietnik et al. | |
| 6,134,338 A | 10/2000 | Solberg et al. | |
| 6,256,108 B1 | 7/2001 | Dziesietnik et al. | |
| 6,269,341 B1 | 7/2001 | Redcay, Jr. | |
| 6,282,327 B1 | 8/2001 | Betrisey et al. | |
| 6,324,521 B1 | 11/2001 | Shiota et al. | |
| 6,331,894 B1 | 12/2001 | Shimizu et al. | |
| 6,498,608 B1 | 12/2002 | Dresevic et al. | |
| 6,628,298 B1 | 9/2003 | Debevec | |
| 6,657,702 B1 | 12/2003 | Chui et al. | |
| 6,760,028 B1 * | 7/2004 | Salesin | G06T 11/203 345/467 |
| 6,853,461 B1 | 2/2005 | Shiimori | |
| 6,930,235 B2 * | 8/2005 | Sandborn | G09B 15/02 84/464 R |
| 7,012,605 B1 * | 3/2006 | Manome | G09G 5/246 345/467 |
| 7,028,260 B1 * | 4/2006 | Morsello | G06T 11/60 715/210 |
| 7,080,047 B2 * | 7/2006 | Kan | G06Q 20/00 235/380 |
| 7,154,621 B2 | 12/2006 | Rodriguez et al. | |
| 7,412,360 B2 | 8/2008 | Surazhsky et al. | |
| 7,444,621 B2 * | 10/2008 | Pletcher | G06F 8/71 717/104 |
| 7,499,055 B2 | 3/2009 | Lin et al. | |
| 7,573,476 B2 * | 8/2009 | Matskewich | G09G 5/246 345/467 |
| 7,640,529 B2 | 12/2009 | Croke et al. | |
| 8,271,388 B2 | 9/2012 | Toshikage et al. | |
| 8,468,055 B2 | 6/2013 | Bennett et al. | |
| 2001/0004261 A1 * | 6/2001 | Kambayashi | G06T 11/203 345/418 |
| 2002/0046089 A1 | 4/2002 | Zorn | |
| 2002/0065578 A1 | 5/2002 | Leone et al. | |
| 2002/0065741 A1 | 5/2002 | Baum | |
| 2002/0093538 A1 | 7/2002 | Carlin | |
| 2002/0095231 A1 | 7/2002 | Yu et al. | |
| 2002/0103697 A1 | 8/2002 | Lockhart et al. | |
| 2002/0123334 A1 | 9/2002 | Borger et al. | |
| 2003/0016842 A1 | 1/2003 | Patton et al. | |
| 2003/0059123 A1 | 3/2003 | Omori | |
| 2003/0063785 A1 | 4/2003 | Oosawa | |
| 2003/0110100 A1 | 6/2003 | Wirth | |
| 2003/0160819 A1 | 8/2003 | Chase et al. | |
| 2004/0000246 A1 | 1/2004 | Keane et al. | |
| 2004/0003342 A1 | 1/2004 | Keane et al. | |
| 2004/0006522 A1 | 1/2004 | Keane et al. | |
| 2004/0008370 A1 | 1/2004 | Keane et al. | |
| 2004/0024575 A1 * | 2/2004 | Surazhsky | G06T 3/0093 703/2 |
| 2004/0083918 A1 * | 5/2004 | Jack | B29C 45/14065 101/485 |
| 2004/0120011 A1 | 6/2004 | Double | |
| 2004/0160444 A1 | 8/2004 | Salesin et al. | |
| 2004/0177114 A1 | 9/2004 | Friedman et al. | |
| 2004/0254833 A1 * | 12/2004 | Algiene | G06Q 30/0248 705/14.47 |
| 2004/0264755 A1 | 12/2004 | Sakaida | |
| 2005/0094205 A1 * | 5/2005 | Lo | G06F 17/212 358/1.18 |
| 2005/0094206 A1 * | 5/2005 | Tonisson | G06F 17/211 358/1.18 |
| 2005/0094207 A1 * | 5/2005 | Lo | G06F 17/243 358/1.18 |
| 2005/0116027 A1 * | 6/2005 | Algiene | G06Q 20/341 235/380 |
| 2005/0286089 A1 | 12/2005 | Lee et al. | |
| 2006/0008177 A1 * | 1/2006 | Chermont | G06T 11/60 382/284 |
| 2006/0119885 A1 | 6/2006 | Jeon et al. | |
| 2006/0233587 A1 | 10/2006 | Vondran et al. | |
| 2006/0260741 A1 | 11/2006 | Crum | |
| 2007/0008343 A1 * | 1/2007 | Scheidhauer | G06F 17/2217 345/636 |
| 2007/0021911 A1 * | 1/2007 | Kikuchi | G01C 21/3673 701/455 |
| 2007/0059613 A1 | 3/2007 | Kitchin et al. | |
| 2008/0040668 A1 * | 2/2008 | Ala-Rantala | G06F 3/0482 715/713 |
| 2008/0147308 A1 * | 6/2008 | Howard | G01C 21/28 701/532 |
| 2008/0147321 A1 * | 6/2008 | Howard | G01C 21/367 701/431 |
| 2008/0177410 A1 * | 7/2008 | Carbonera | B44B 1/006 700/98 |

(56) References Cited

U.S. PATENT DOCUMENTS

2008/0215240 A1* 9/2008 Howard ................. G01C 21/36
 701/469
2009/0002751 A1 1/2009 Yun et al.
2009/0190858 A1* 7/2009 Moody ................... G06T 11/60
 382/276
2009/0259934 A1* 10/2009 Prisament ............. G06F 16/972
 715/234
2009/0297033 A1* 12/2009 Ito ............................ G06T 9/00
 382/197
2010/0100238 A1 4/2010 Torian

OTHER PUBLICATIONS

Weigand, C.J., "2nd Edition Using Pagemaker Macintosh version", 1990, Que Corporation, 2nd edition, pp. 137-140, 153. (Year: 1990).*

"Sgt. Pepper's Lonely Hearts Club Band", The Beatles, retrieved online at url: "http://en.wikipedia.org/wiki/Image:Pepper%27s.jpg" Parlophone Capitol, cover, Jun. 1, 1967.

Herzog, B, et al., "Sketch Tutor User's Guide", retrieved online from url http://web.archive.org/web/20030712063923/http://linuxgraphic.org/section2d/sketch/docsketch_eng/docsketch.pdf, pp. 1-61.

* cited by examiner

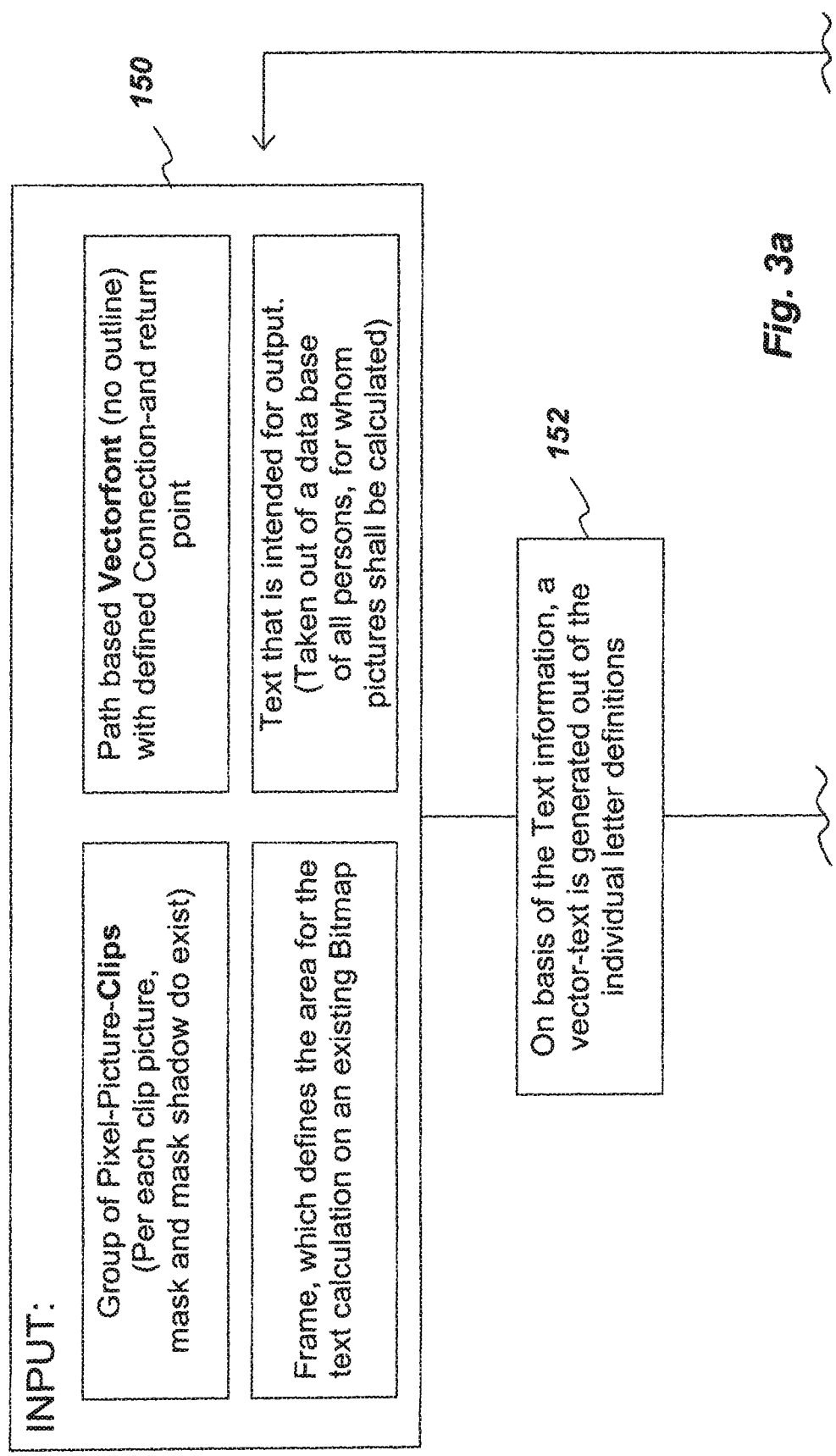

| Filtering of every single clip on the path | | | |
|---|---|---|---|
| Positioning on three different tracks (main track, "left wheel", "right wheel") | Hard shadow + 3D-Clip Clip Shadow for stimulation of height differences in the third dimension | Masking of track for management of the incidence of light | Random change in size |
| Different weighting of the individual clips (management of frequency) | "Bevel & Emboss" of the individual clips to ensure the incidence of light + 3 dimensionality in different angles of rotation | Defined rotation depending on the inclination angle of the path | Random lack of definition for movement |
| Random rotation | Random soft focusing of the clips | Change in size depending on the perspective | Change in the soft focusing depending on the perspective |

PROCESS FOR GENERATING IMAGES WITH REALISTIC MODIFICATIONS

CROSS-REFERENCE TO RELATED APPLICATIONS

The present application is a divisional of U.S. patent application Ser. No. 13/339,650, filed on Dec. 29, 2011, which is a divisional of U.S. patent application Ser. No. 10/886,775, filed on Jul. 7, 2004, which issued on Feb. 21, 2012 as U.S. Pat. No. 8,121,338, the entirety of each which is incorporated herein by this reference thereto.

BACKGROUND

The present invention relates generally to a personalized printed postcard, mailing or output image file, and more particularly to a personalized printed postcard, mailing or output image wherein a personal message appears to be a natural element within a background.

In the advertising industry, there is a growing need for individualization/personalization of various advertising materials such as Christmas cards, mail shots and other similar mailings. Typically, in the advertising industry the personalized mailings are sent to numerous individuals within a community in a single mailing (i.e., mass mailing or batch processing). In this regard, each mailing may be associated with a specific data record within a database. Each data record is read and inserted into a base image. Accordingly, in the professional advertising sector, this creates a personalized mailer. Nonetheless, this method of personalizing the mailing creates an impression that the text of the personal message is computer generated and a part of a mass mailing program.

For example, German Application Publication 43 28 908 discusses a process by which an advertising message or individual text is printed on greeting cards. Although the process discussed in the German publication provides for printing individual cards and outputting image files, the personalized message may only be printed on a part of the image or in a separate box. Further, if the text of the personalized message is unacceptably long, either the text is not accepted or the text is printed outside the visually printable area. Accordingly, this process produces an image which is visually unsophisticated.

To achieve a visually sophisticated image, a complex graphics program must be utilized, such as that described in the comparison test "Mathematical Beauties", Volume 2001, page 142 ff. The operation of such complex graphics program even with simplifying the program to rapidly generate an output image, is too difficult for lay persons to operate and does not allow the production of mass mailings with personalized messages matched to the background.

Accordingly, the object of the invention is therefore to create a process for generating an output image file in which maximum visual attractiveness is achieved and alternate features are unincorporatable with the output to increase the attractiveness of the outputted image may be processed automatically. A further object of the invention is to create hardware and software to implement the process.

SUMMARY

In accordance with the present invention, there is provided a process by which a highly attractive output image file is produced. In this regard, the output image file comprises a base image and a personalized message. The base image is a background of the output image such as a picture of a park, national landmark, or any other appropriate scenery or motif. The personalized message is typically a string of text which may be customized to an individual or entity (e.g., name, address, and/or message). Generally, in an aspect of the present invention, the personalized message is overlaid onto the base image to provide an output image file to create an attractive output image.

In another aspect of the present invention, the personalized message may appear realistic in that the personalized message may appear to be an integral part of the base image. For example, if the base image is a picture of a park in autumn with leaves of trees fallen on the ground, the personalized message may be formed by aligning the fallen leaves on a grass landscape such that it would appear that a person had arranged the leaves to form the words of the personalized message and had taken a picture of the park with the arranged leaves. Other visual effects may also be incorporated into the output image which provides additional variation and attractiveness to the output image. For example, the personalized message may appear to be a message written in sand with a finger, message written in snow of a winter landscape, message chiseled in brickwork of a famous building, or other similar types of adaptations to the background. Other features which may be incorporated into the personalized message is kerning where letters may be placed next to each other such that a first letter may undercut a second letter. Not only may the personalized image be formed from images in the background such as autumn leaves, the autumn leaves themselves may be randomly placed about and on the personalized message and on the personalized message to provide the impression that the personalized message was naturally formed by wind or that someone had arranged the leaves to produce the text. Moreover, a shadow effect may be imparted onto the personalized message to further enhance the realistic effect of the output image file.

Other variations to further enhance the realistic impression of the output image file may include random orientation of the background elements of the base image used to form the letters of the personalized message. Additionally, the background elements forming the message may appear to be moving. For example, the message may appear to have formed while the autumn leaves were falling off the trees as the message is formed with the addition of movement lines. These as well as other visual effects may be incorporated into the output image file to create a highly attractive and realistic personalized message.

As stated above, the output image file comprises a base image and a personalized message. In this regard, the base image may define a position frame in which the personalized message is inserted. The frame defines the outer limits in which the personalized message (i.e., text string) must fit. In the frame, a vector path is defined and along this vector path background elements of the base image or other elements may be aligned and arranged to form the words of the personalized message.

BRIEF DESCRIPTION OF THE DRAWINGS

An illustrated and presently preferred embodiment of the present invention is shown in the accompany drawings in which;

FIGS. 3a-3e a detailed process of steps 120, 130 and 140 of the process shown in FIG. 2.

DETAILED DESCRIPTION

Figure 1:
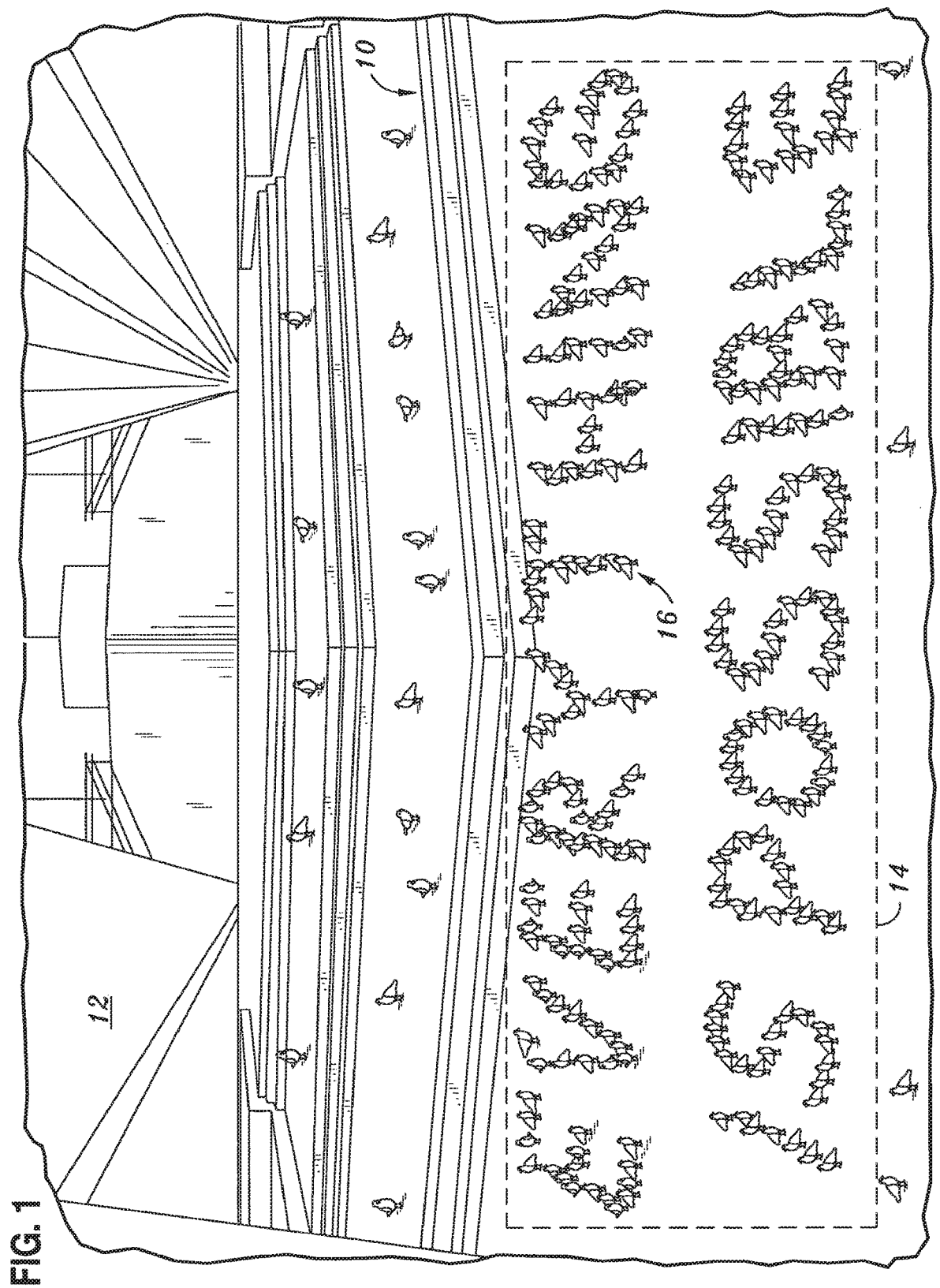
FIG. 1 is an output image illustrating a personalized message inserted into a base image.

In an aspect of the present invention, a personalized message 10 or text component may be inserted into a base image 12. For example, as shown in FIG. 1, the personalized message "EVERYTHING IS POSSIBLE" is inserted into the base image (i.e., building steps with pigeons). In this regard, the various aspects of the present invention may be embodied in a computer loaded with software to produce a highly personalized and realistic image which may be viewed on a computer monitor or printed on paper (i.e., output file).

As stated above, the personalized message or text component may be inserted into the base image. In particular, the personalized message may be inserted into a position frame 14 which is defined by an area within the base image. By way of example and not limitation, the personalized message may be a text string. Further, it is also contemplated within the scope of the present invention that the personalized message may be other image elements (e.g., autumn leaves), lines or other elements. Accordingly, the personalized message may correspond with the motif of the base image. For example, the motif of the base image may be sand, snow, brickwork or autumn leaves and respectively, the personalized message may resemble words written in sand by a person's finger, words written in snow by a person's finger, brickwork of a famous building chiseled out to give the impression of an inscription in such brickwork, or autumn leaves arranged on grass to form the words to give the impression that a person had arranged the leaves. These motifs (e.g., sand, snow, brickwork, and leaves) are provided by way of example and not limitation. In this regard, it is contemplated within the scope of the present invention that the base image may resemble other motifs with corresponding personalized messages.

For the selected base image and inserted personalized message, the scaling and adaptation of the personalized message may be accomplished independently of each other. Further, for personalized messages that cannot fit on one line within the position frame, a line break may be inserted in the text string such that words may be distributed on a second line within the position frame evenly. Preferably, the line break may be inserted right before the words pass the outer limits of the position frame. Moreover, when the number of lines exceed the maximum height of the position frame, then individual components (i.e., autumn leaves) that make up the letters of the words may be scaled down or otherwise reduced by a pre-defined maximum scaling factor (e.g., minimum word size) to guarantee legibility of the words.

The text string of the personalized image may be confined within the position frame. For example, a personalized message may be written on a Brandenburg Gate on a postcard, and in this regard, the position frame may be positioned and limited to the structural features of the Gate. Accordingly, the text of the message should not extend beyond the building. This confinement of the personalized message to the Gate (i.e., position frame) is achieved by adapting an element (i.e., letters are comprised of elements or individual components) size to a resulting text size which is generated from a vector path adapted to the position frame. The size of the elements to be placed on the vector path is matched to the detail of the vector path.

A safety routine may be implemented in the computer and software such that a user may be warned if the text string is too long such that the personalized message cannot fit within the position frame with a size greater than the minimum word size to ensure legibility. Further, in a batch process of inserting personalized messages (i.e., data records) into respective base images, those personalized messages which cannot be inserted into the position frame of the base image and maintain a minimum height may be earmarked for manual processing in which a solution may be developed such as using abbreviations.

In another aspect of the present invention, a realistic personalized message inserted into a base image may be generated wherein realistic in this context means that the viewer of the output image has an illusion that the inserted personalized message was a part of the image from the outset (e.g., autumn leaves forming text). Moreover, it is contemplated within the scope of the present invention that realistic labeling of pictures may be automatically generated. In contrast, in the prior art, a realistic personalized message may not be achieved. Rather, the know applications only inserts the personalized message in the base image without any process of generating a realistic personalized message. Further, in the prior art, if a realistic personalized message was desired, then the user manually adapted the personalized message with the background (e.g., motif) of the base image to create the realistic personalized message.

In another aspect of the present invention, the software loaded on the computer may be designed for mass print runs (i.e., batch runs) of a base image with a plurality of personalized messages or for mass print runs of a plurality of different base images with a plurality of respective personalized messages. In this regard, a printer may be attached to the computer. The base image may be translated into a language of the printer only once such that lengthy calculations are omitted during processing of the batch run even if the base image contains complex graphics. For each print job, only the personalized message is converted into control codes for the printer. Further, this process can be repeated for each different base image and corresponding personalized messages. Accordingly, rapid processing of batch runs are made possible by the present invention.

More particularly, an image generation unit may automatically determine which points of the base image have been changed by the inserted personalized message. An extract image of the changed points (i.e., changed area) may be stored for each output image containing all changes and with its corresponding position data. On printing, the base image is calculated only once by the Raster Image Processor (RIP) to make ready the base image for printing. When the output image with the inserted personalized message is sent to the printer, then the calculated base image is printed on the page and only the extract image is placed over the printed base image with a precise fit. Thereafter, for each personalized message, only the extract image is calculated by the RIP. This increases the printing speed usually by a factor of two (2) to (five) 5 and reduces the print file by about the same factor.

In another aspect of the present invention, the letters forming the words of the personalized message may be automatically selected from a list of alternative letter designs. In particular, each letter within the alphabet may have three alternative designs. A first design may have a transition point at a lower portion of the letter. The transition point is where the letter may be connected to an adjacent letter. A second design may have a transition point at a middle portion of the letter. And, a third design may have a transition point at an upper portion of the letter. As such, for example, if the personalized message contained the name "Sylvia", the software randomly selects an "S" from a spline vector font formed by a multiplicity of individual letters. Thereafter, the software selects the appropriate alternative designs for the letter "y" that would smoothly connect with the selected S. The most appropriate alternative design for the letter "y" may have a initial point closest to the terminal point of the selected "S". Further, optionally, the selected "y" may be merged with the selected "S" to further provide an illusion that Sylvia was handwritten.

The letters of the personalized message may be adapted to resemble a particular typeface. This may be a font where each letter is formed from a plurality of images (e.g., footprint in snow) or each letter is formed by an image (e.g., cake letters). Further, each typeface may have alternative designs for the same letter.

A kerning technique for conventional vector writing may be employed for a text string of the personalized message. In particular, each letter has a Step Kerning so that the letters can be placed next to each other such that undercuts are possible. For example, a small "a" may be slipped under a large "T" because the horizontal bar of the T would not protrude into the "a".

Decorative elements may also be inserted and arranged next to the text of the personalized message to additionally create the illusion of a realistic personalized message. For example, if a base image is that of a park with grass, a position frame is located in the grass area, and words of a personalized message were written with fallen leaves of a tree, then forming the words with the leaves on the grass without any other leaves on the grass would make the output image appear computer generated. Accordingly, other leaves (i.e., decorative elements) may be inserted on or adjacent the words of the personalized message to give the realistic impression that a person had arranged the leaves to form the words on the grass.

Elements 16 (see FIG. 1) may also be rotated along the vector path. For example, if the words of the personalized message were formed with straws, then it would appear to be unnatural if each straw were positioned vertically. As such, each straw may be placed along the vector path with slight angular deviations.

To further enhance the realism of the output image, another visual effect that may be incorporated into the process is to incorporate a shadow effect on the words/text of the personalized message. To this end, a solarization direction may be established. When arranging or inserting the personalized message into the position frame of the base image, the software additionally retrieves a solarization direction associated with the base image. The association between the base image and solarization direction may be predefined based on the selected base image or may be manually selected by a user. Once the solarization direction has been determined, the software then adds the extra shadow effect to the personalized message as a function of this solarization direction. In this regard, the output image (i.e., base image with the personalized message inserted into the position frame) is constructed with a layer technique wherein the back of the output image is constructed first and then the front is constructed such that the shadows are covered by the elements, or in other words, are arranged in perspective such that the elements are in front and their shadows in the back. As with known programs, a technique with two planes may be used. In one plane, pixel areas are defined which may be described as the images being further built up. In the second plane, the actual image is arranged.

For some of the visual effects discussed above, it is necessary to define a curve along which individual components are arranged to form the personalized message. In this regard, the personalized message may be constructed with individual components such as lines, images, letters, background parts or pure text components. For example, images may be footprints, shoeprints, matches and/or butterflies. Background parts of the pixilated base image may be used if the personalize message is to be simulated in the base image such as when the personalized message appears to be a message written in sand. Further, using the shadow function discussed above, a solarization direction may be defined and the direction from which light falls on the objects of the base image and the shadow from the individual components may be calculated and added to the output image.

In another aspect of the present invention, incorporation of curve technology into the output image is also possible wherein the individual components/elements are uniquely aligned. In particular, a Bezier curve defines a plurality of nodes. At each node of the curve, a tangent gradient may be determined and the individual components may be inserted and aligned to this gradient. For example, if a name of a person is to be shown by footprints in sand, the footprints may be aligned by arranging their longitudinal direction parallel to the tangent gradient/direction. Further, depending on the motif of the base image selected, instead of placing the individual components at a fixed angle of 0 degrees relative to the tangent direction, a different fixed angle may be selected or the angle may be randomly selected for each adjacent individual component. For example, randomizing the angle at which the individual components are inserted into the position frame with respect to the tangent direction discussed above may be incorporated into the output image when the personalized message is constructed with an arrangement of leaves of a tree.

In another aspect of the present invention, additional movement lines may be incorporated into the personalize message to impart an impression that the individual components (e.g., leave) were in motion when the output image was photographically taken. For example, the movement lines may provide an illusion that fallen autumn leaves formed the personalized message as the autumn leaves were falling off the trees or that a flock of birds moved into formation to form the personalized message. To this end, the individual components may be blurred on a side opposite the direction of movement. For example, if the personalized message is formed to impart an illusion that the personalized message was formed as the autumn leaver were falling, then the blurring of the individual components (e.g., autumn leaves) may be located on an upper side of the autumn leaves.

In another aspect of the present invention, the individual component may be associated with a typeface. For example, the typeface may be background areas of the base image or constructed from independent images. The typeface may also be a true type font (TTF) if a true type font is generated, the inputted text may easily be arranged within the position frame.

An impression that the individual component have been embossed or indented into the base image may also be imparted onto the base image. To form this three-dimensional effect, peripheral edges of the individual component text string may be darkened or lightened. For example, the individual components may be ASCII symbols which may be generated from background areas of the base image to form the three-dimension of effect described above. In the alternative, the ASCII symbols may be constructed from independent image elements which are arranged adjacent to each other or overlap each other to form the ASCII symbols.

Further, the ASCII symbol may also be generated from a entire image. For example, the ASCII symbol may have a form of a watercourse, a snake or a rope which may be curved to form the letters of the personalized message/individual components. The ASCII symbol may also be matches arranged to compose the letters of the personalized message.

The individual components are arranged such that they are overlapping with each other or separate from each other. In the latter, the spacing between the individual components may not be too great otherwise the effect of a cohesive writing would be lost. In addition to arranging the individual component to form the letters of the personalized message, additional images of the individual components may be distributed over the position frame to further enhance the realistic nature of the output image. For example, additional fallen leaves may be arranged around a personalized message formed with fallen leaves. The additional individual components distributed in the position frame may also be randomly distributed in a predetermined density such that the position frame does not appear as an unnatural/foreign object on the grass. With the additional individual components (e.g., autumn leaves) randomly distributed over the position frame in a predetermined density, the legibility of the personalized message must still be retained. To this end, edges of the individual components or letters of the personalized message may have a lower density definition (i.e., lighter) or be kept clear of the additional individual components.

Typically, as discussed above, the position frame 14 (see FIG. 1) has a transparent background such that the base image is still viewable through the position frame except for the portion of the position frame that is changed by the letters of the personalized message. In the alternative, it is possible to provide a position frame with a different or personalize or individual background to achieve the effect of a shield (i.e., a second background). For example, if the individual components are ASCII symbols, then these symbols can be broken down into linear part sections and each of these linear part sections may be depicted by one or more images. In this regard, bars or matches may be selected.

Typically, the individual components are constructed with image elements or text strings which may be inputted automatically into the position frame. Moreover, a plurality of text strings may be stored in a database such that each individual component may be automatically inputted into the position frame by software. In this regard, a system may be constructed wherein a mass mailing may be produced. Alternatively, the text string may be entered manually via a computer keyboard. In this regard, instead of storing a plurality of text strings in a database and automatically inserting each of the text strings of the database into a position frame, the individual component/text string may be inserted into the position frame as the text string is being entered via the keyboard. For example, a self service machine may be erected at a tourist site such that the tourist may enter a text string via the keyboard to produce an output image (i.e., resulting product) with the typed text string integrated into the base image.

The aspects of the present invention may also be used to generate a standard letter. For example, a computer network may be implemented such that a graphics program incorporating the various aspects of the present invention discussed above is installed on a server computer. The server computer may have a sufficiently high computing power to perform the calculations required to accomplish the various effects and aspects discussed above. The server computer may be connected to an operator's computer via a normal data line such as an internet line such that the various aspects of the present invention is performed as part of an Internet application. In this regard, a powerful intranet or separate client/server application may also be used.

The computer network discussed above may have an output unit (e.g., printer or computer monitor) attached thereto. Depending on the computing power of the computer network, the printer may print the entire output image or only the position frame. Typically, the printer prints only the position frame if the server computer does not have sufficient computing power to timely provide the output image to a user of the graphics program. For example, a low power computer may be used in the self service machines discussed above and a preprinted card (i.e., card printed with the base image) may be used in the self service machine. Thereafter, the self service machine may be equipped with a printer which only prints the position frame. This method of printing the resulting product may lead to inaccuracies depending on the quality of the paper, quality of the printer, print quality, and paper guide. Accordingly, a sufficiently powerful computer system is preferred such that the output image may be entirely generated by the computer system and the complete letter or greeting card printed.

The graphics program incorporating the various aspects of the present invention discussed above may require greater computing power than that which may be provided by a single computer. In this regard, a network of computers may be used to break down the computing tasks required to generate the output image, assign those individual tasks to the individual computers within the network of computers, receive the calculated results, and assemble those results into the final output image file. Moreover, a server of the computer network may also insure that a task assigned to a particular computer within the computer network is assigned to a different computer if the computer originally assigned to perform the task fails in any way.

When a network of computers is used, a lower resolution depiction of the base image with the position and size of the position frame may be transmitted to the client computer. The user via a keyboard of the client computer may enter the text string/personalized message. The inputted text string is then transmitted to the server and the server produces a high resolution output image file and the output image file is sent to the output unit.

Instead of sending the high resolution output image file to a printer, the file may be electronically sent as an email attachment to a database of emails (i.e., mass email) or to a single email (i.e., personal electronic postcards).

Figure 2:
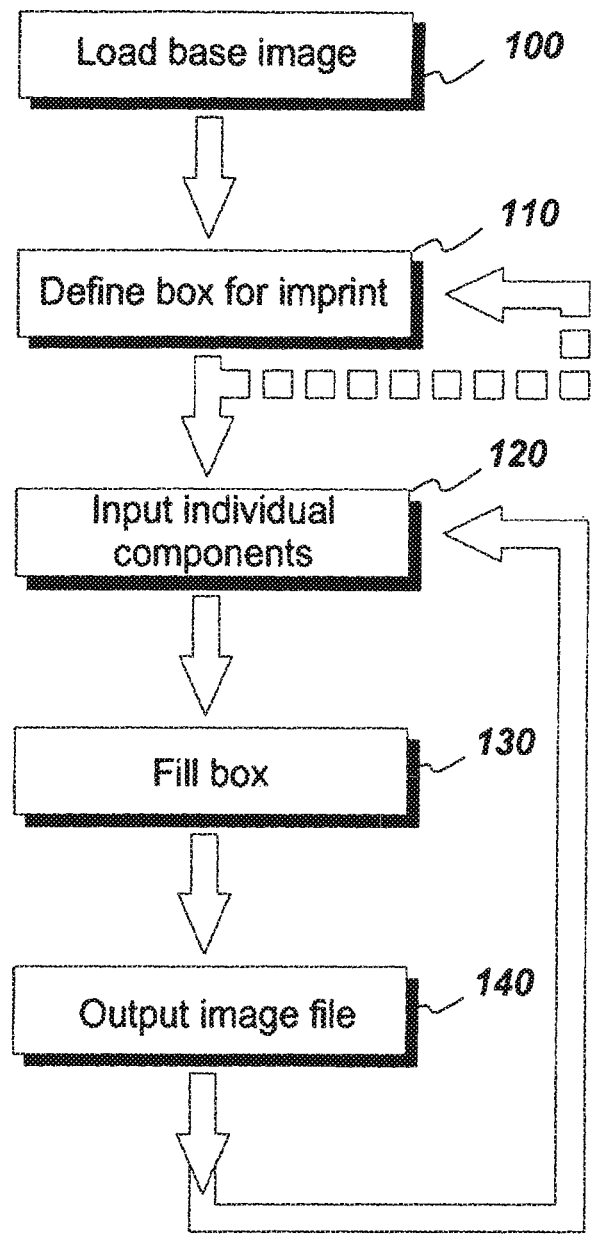
FIG. 2 is a simplified block diagram of an embodiment of a process of the present invention.

Referring now to FIG. 2, the same illustrates a general overview of the process to create the final output image incorporating the various aspects of the present invention discussed above. As shown in step 100, a base image is first selected which may be predetermined or alternatively, the user may be able to choose a base image from a list of base images.

After the base image is loaded, the position frame (i.e., box) is defined in step 110. In a simple system such as the self service machine discussed above, the user of the self service machine may not be provided with the option of manipulating or changing the actual location of the position frame within the base frame. For complex systems such as those used by advertising agencies desiring to produce a mass mailing, the user may be given the ability to manipulate the position frame with respect to its location and size such that the user may be better able to determine the text string length to be inserted into the position frame. Even though the user may be given the option to otherwise manipulate/adapt the position frame, the extent of the manipulation/adaptation may be restricted or controlled. For example, only particular areas of the base image may be released for overlaying with the position frame. Further, there may be several position frames where individual components may be inserted by the user.

After the position frame has been defined, the user inputs the text string via a computer keyboard into the position frame in step 120. If there are several position frames, then the process of inputting the text string is repeated until all necessary inputs have been made. The position frame is then filled in step 130 and an output image file is sent to an output unit (step 140) such as a printer or email addresses. For mass output, this process discussed above may be repeated until all data records within the database have been processed.

Figure 3B:
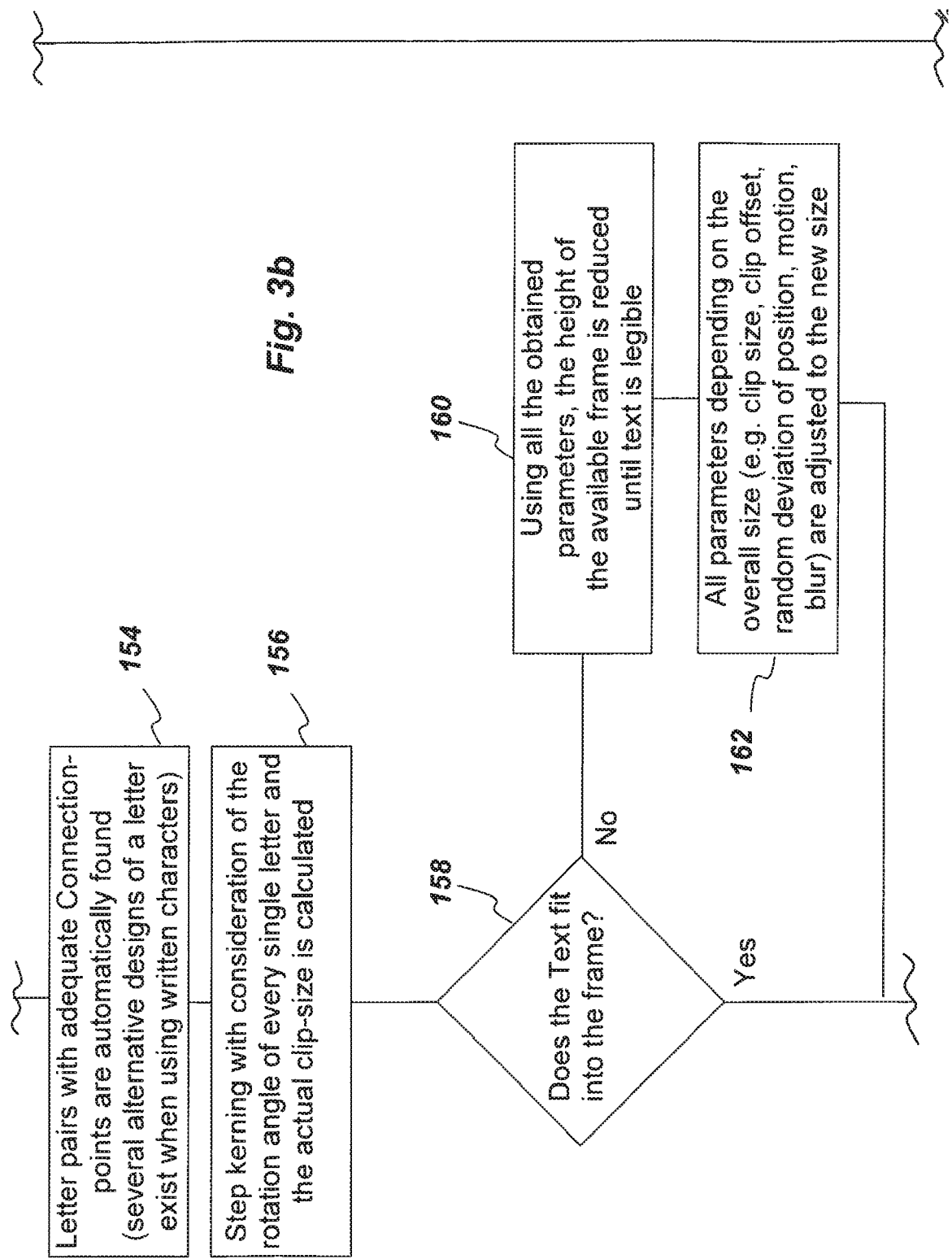

Referring now to FIGS. 3a-3e, the same illustrates a detailed view of the process steps 120, 130 and 140 as shown in FIG. 2. In particular, as shown in FIG. 3a, in step 150, an input is provided which comprises (1) group of pixel-picture-clips (per each clip picture, mask and mask shadow to exist), (2) path based vector font (no outline) with defined connection and return point, (3) frame which defines the area for the text calculation on an existing bitmap, and (4) text that is intended for output (taken out of a database of all persons, for whom pictures shall be calculated). Thereafter in step 152, on basis of the text information, a vector text is generated out of the individual letter definitions. In step 154, as shown in FIG. 3b, letter pairs with adequate connection points are automatically found (several alternative designs of a letter exists when using written characters). In step 156, step kerning with consideration of the rotation angle of every single letter and the actual clip-size is calculated.

Figure 3C:
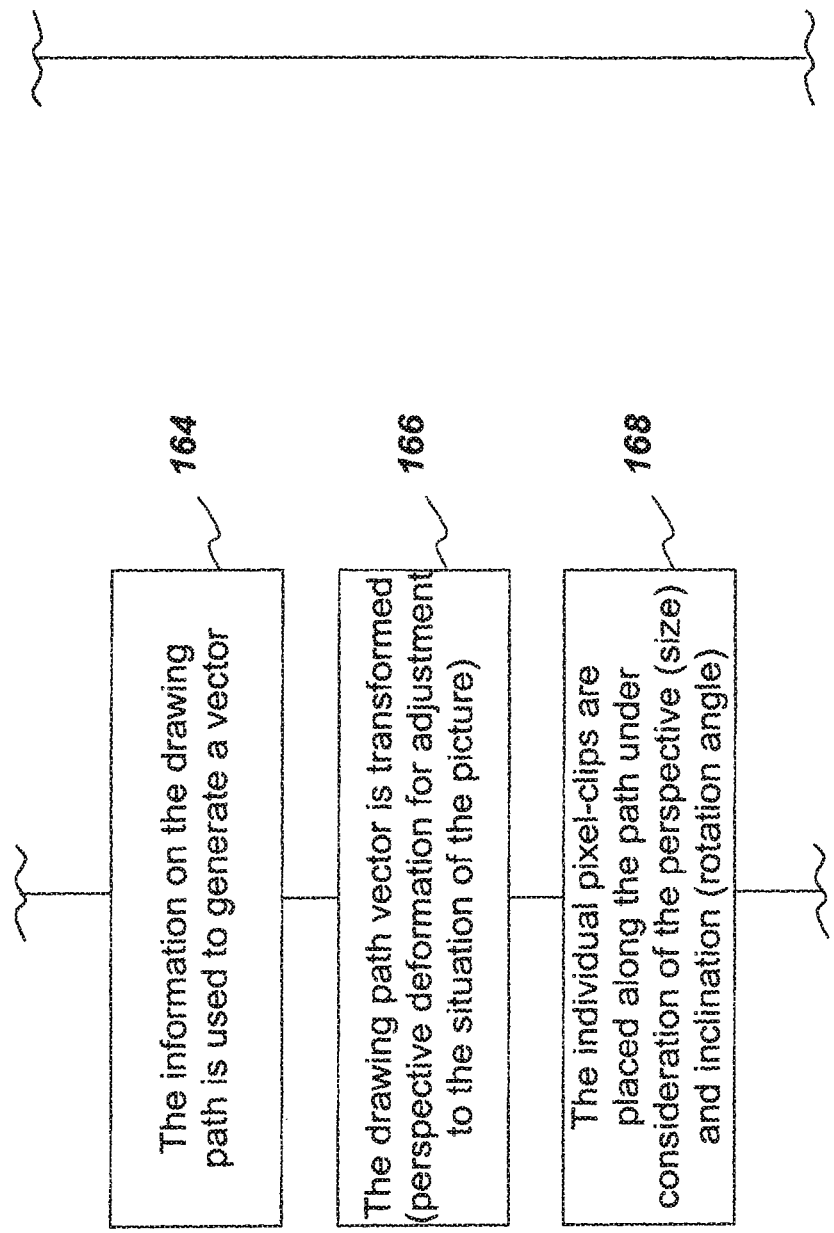

In step 158, a decision is made whether the text fits into the frame. If the text does not fit into the frame, then in step 160, using all of the obtained parameters, the height of the available frame is reduced until text is legible. Then in step 162, all parameters depending on the overall size (e.g., clip size, clip offset, random deviation of position, motion, blur) are adjusted to the new size. Thereafter, in step 164, as shown in FIG. 3c, the information on the drawing path is used to generate a vector. In the alternative, if the text does fit into the frame then in step 164, the information on the drawing path is used to generate a vector.

In step 166, the drawing path vector is transformed (perspective deformation for adjustment to the situation of the picture). In step 168, the individual pixel-clips are placed along the path under consideration of the perspective (size) and inclination (rotation angle).

Figure 3E:
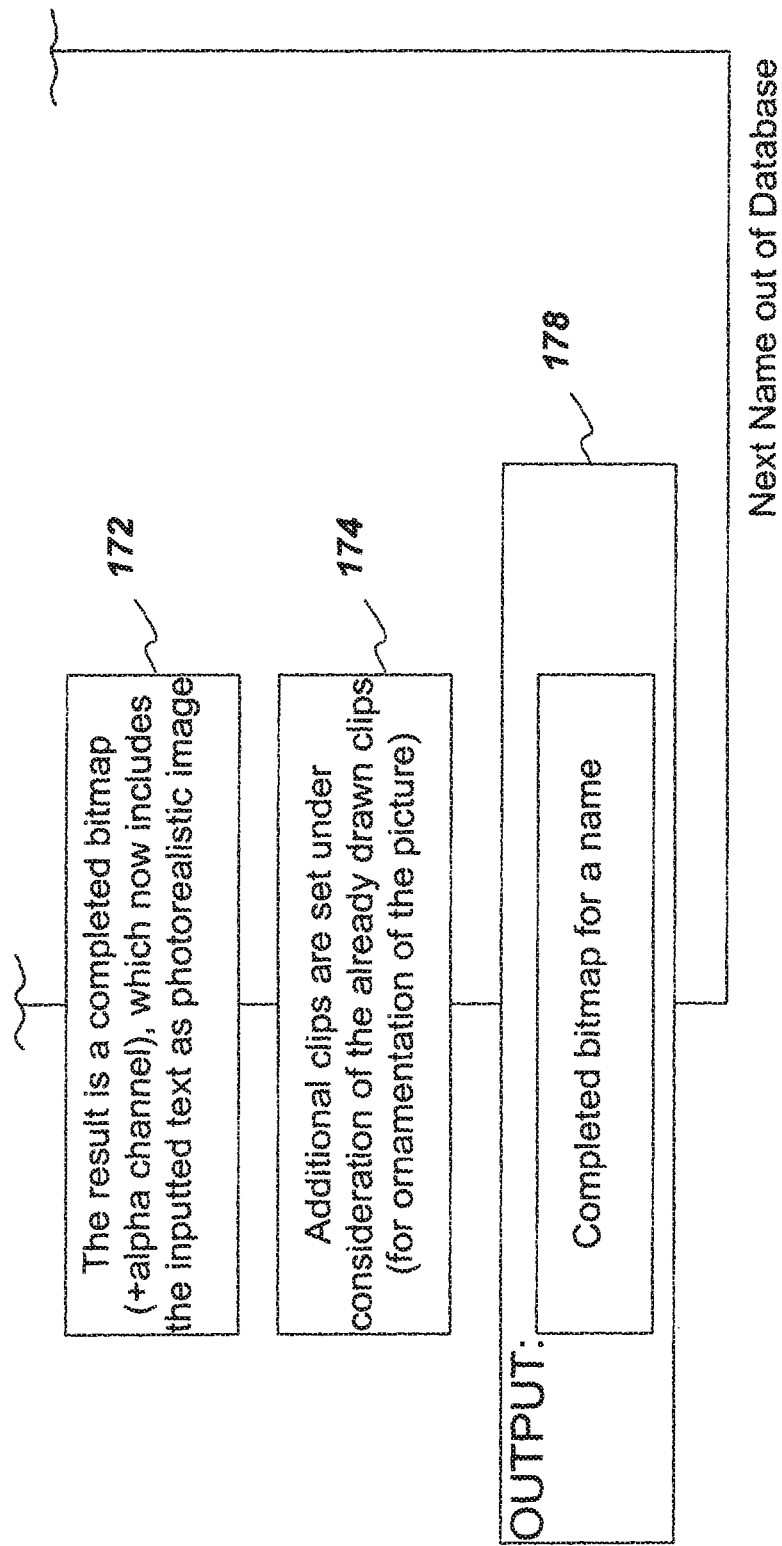

As shown in FIG. 3d, step 170 is the step of filtering of every single clip on the path. In step 172, as shown in FIG. 3e, the result is a completed bitmap (+alpha channel), which now includes the inputted text as photorealistic image. In step 174, additional clips are set under consideration of the already drawn clips (for ornamentation of the picture). In step 178, the output is a completed bitmap for a name. This process shown in FIGS. 3a-3e is repeated for every name out of a database.

This description of the various embodiments of the present invention is presented to illustrate the preferred embodiments of the present invention, and other inventive concepts may be otherwise various embodied and employed. The appended claims are intended to be construed to include such variations except insofar as limited by the prior art.

We claim:

1. A method for generating an image with a realistic personalized text insert via software loaded on a computer, the method comprising the steps of:
   a. providing a base image with at least one position frame defined within the base image, the position frame defining an area where the text insert is insertable;
   b. defining a vector path within the position frame;
   c. selecting natural objects from the base image, the natural objects consisting of at least two pixel elements;
   d. generating letters of the text insert by adapting automatically the base image in the proximity of the vector path to create a representation of the base image with letters of the text insert fitted as natural objects in the base image; and
   e. outputting an output image file to an output unit.

2. The method of claim 1, wherein the generating letters step includes the steps of providing alternative designs for each letter of the text insert, each design having a different transition point for selective connection to an adjacent letter, each letter being formed in a continuous line according to a predefined spline vector font.

3. The method of claim 2:
   a. wherein the generating letters step, the alternative designs for each letter have three different transition points, the three designs being a first design with a first transition point at a lower part of the letter, a second design with a second transition point at a middle part of the letter, and a third design with a third transition point at an upper part of the letter; and
   b. wherein the generating letters step further comprising the steps of:
      i. selecting one of the first, second, or third designs with the closest transition point with the adjacent letter; and
      ii. merging the selected design with the adjacent letter at the transition point of the selected design.

4. The method of claim 1 wherein the generating letters step further comprises the step of kerning the generated letters such that at least one of the letters protrudes into free spaces of an adjacent letter.

5. The method of claim 1 further comprising the steps of:
   a. selecting a base image from a plurality of base images, each base image having at least one direction of solar irradiation associated therewith;
   b. retrieving the direction of solar irradiation associated with the selected base image; and
   c. imparting a shadow effect on the letters based on the retrieved direction of solar irradiation.

6. The method of claim 1 further comprising the step of contrasting edge areas of the letters to form a three-dimensional embossed or indented effect.

7. The method of claim 1 further comprising the step of randomly distributing additional selected elements into the position frame in a predetermined density.

8. The method of claim 1, wherein a background of the position frame is transparent.

9. The method of claim 1, further comprising the step of entering a text string of the text insert via a computer keyboard.

10. The method of claim 1, wherein the output unit is a printer.

11. The method of claim 1, further comprising the step of batch processing a plurality of text inserts, the batch processing step comprising the steps of:
 a. providing a database of text inserts;
 b. sequentially completing steps a, b, cm and d of claim 1 for each text insert contained in the database to generate a plurality of output image files; and
 c. outputting the plurality of output images files to the output unit.

12. The method of claim 11, wherein the batch processing step further comprises the steps of:
 a. determining an area of the base image that would be changed if the text insert were inserted into the base image;
 b. storing data of the such area and its corresponding position data;
 c. sending the base image once to the output unit for calculation by the raster image processor; and
 d. precisely combining the data of such area and the calculated base image.

13. The method of claim 1, further comprising the step of providing software programmed to accomplish the defining, arranging and composing steps.

14. The method of claim 13, further comprising the steps of:
 a. providing a client/server system comprising a server loaded with the provided software; and
 b. providing a client computer which is communicable with the central computer via a data line of a network.

15. The method of claim 14, wherein the network is an Internet.

16. The method of claim 14, wherein the server comprises at least one computer and a control computer, the control computer having loaded thereon a control program to divide a task of calculating the base image and text insert into discrete jobs, assign the divided task to respective computers, receive the calculated results from the respective computers, and compile these received calculated results into an output image file.

17. The method of claim 14, further comprising the steps of:
 a. providing software loaded on the server which associates a low resolution image with a high resolution image;
 b. transmitting from the server to the client computer the low resolution image, location of position frame and size of the position frame;
 c. inputting text into the client computer;
 d. transmitting the inputted text from the client computer to the server;
 e. producing on the server a high resolution image comprising the text inputted into the client computer based on the transmitted inputted text and on low resolution image; and
 f. transmitting the high resolution image comprising the text to an output unit.

18. An apparatus for generating an image with a realistic personalized text insert comprising:
 at least one processor operable to execute computer program instructions; and
 at least one memory operable to store computer program instructions executable by said at least one processor, for performing:
 a. providing a base image with at least one position frame defined within the base image, the position frame defining an area where the text insert is insertable;
 b. defining a vector path within the position frame;
 c. selecting natural objects from the base image, the natural objects consisting of at least two pixel elements;
 d. generating letters of the text insert by adapting automatically the base image in the proximity of the vector path to create a representation of the base image with letters of the text insert fitted as natural objects in the base image; and
 e. outputting an output image file to an output unit.

* * * * *